United States Patent
Kasper, II

(10) Patent No.: US 7,539,758 B2
(45) Date of Patent: May 26, 2009

(54) METHOD AND SYSTEM FOR TRIGGERING AN AUTOMATIC LOG-OFF OF DATA LINK LAYER PASS-THROUGH APPLICATION

(75) Inventor: David J. Kasper, II, Aliso Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1352 days.

(21) Appl. No.: 10/147,116

(22) Filed: May 16, 2002

(65) Prior Publication Data

US 2003/0217154 A1    Nov. 20, 2003

(51) Int. Cl.
G06F 15/16 (2006.01)
H04L 12/28 (2006.01)

(52) U.S. Cl. .................... 709/227; 370/395.2

(58) Field of Classification Search ......... 709/227–229; 370/395.2
See application file for complete search history.

(56) References Cited

U.S. PATENT DOCUMENTS

| | | | | |
|---|---|---|---|---|
| 5,163,055 A | * | 11/1992 | Lee et al. | 714/748 |
| 5,444,849 A | * | 8/1995 | Farrand et al. | 709/237 |
| 5,604,487 A | * | 2/1997 | Frymier | 709/217 |
| 5,960,036 A | * | 9/1999 | Johnson et al. | 375/219 |
| 5,970,066 A | * | 10/1999 | Lowry et al. | 370/353 |
| 6,278,728 B1 | * | 8/2001 | McHale et al. | 375/219 |
| 6,292,488 B1 | * | 9/2001 | Filgate | 709/235 |
| 6,611,868 B1 | * | 8/2003 | Arutyunov | 709/227 |
| 6,831,930 B1 | * | 12/2004 | Swam | 370/535 |
| 2002/0083351 A1 | * | 6/2002 | Brabenac | 713/300 |
| 2003/0217154 A1 | * | 11/2003 | Kasper, II | 709/227 |
| 2003/0233583 A1 | * | 12/2003 | Carley | 713/201 |

OTHER PUBLICATIONS

OSI network model, printed Apr. 4, 2005.*
Free Dictionary, OSI Model, printed Jun. 10, 2005.*
Formal Specification and Verification of OSI Session Layer Protocol Using CCS, Milica Barjaktarovic et al., Aug. 13, 1993.*
In Search of Invariants for E-Business Workloads, Daniel Menasce, Oct. 17, 2000.*
Dyanic Behaviour of AirCom Internet Users on Long-Haul North Atlantic Flights, Peter Unger et al., 2004.*
Arugments for Cross-layer optimization in BLuetooth scatternets, Raman B et al., Jan. 8, 2001.*

* cited by examiner

Primary Examiner—Larry D Donaghue
Assistant Examiner—Ajay Bhatia
(74) Attorney, Agent, or Firm—Fogg & Powers LLC

(57) ABSTRACT

A communication system includes a local unit that has a lower data link layer and a session layer running a data pass-through application and a user interface. The data pass-through application lets the data link layer in the local unit pass data through to a remote unit. The remote unit has a lower data link layer and a session layer executing a user interface. When the data link layer detects that the session layer is unstable and/or locked up, the data link layer transmits a disconnect request to the local unit's data link layer. All further user data sent to the local unit's data link layer is routed to the local unit's user interface.

20 Claims, 3 Drawing Sheets

METHOD AND SYSTEM FOR TRIGGERING AN AUTOMATIC LOG-OFF OF DATA LINK LAYER PASS-THROUGH APPLICATION

TECHNICAL FIELD

The present invention relates generally to data communications and particularly to data communications through a modem.

BACKGROUND

Communication networks may have a local unit through which a computer user communicates with a remote unit. The local unit might be a modem or other similar communication device that acts as a pass-through device or data pipe to pass all data through to the remote unit. The remote unit would then be a remote modem that is located at a different site.

When the local unit connects to the remote unit, some type of coordination or handshaking is typically performed as the local unit becomes a pass-through device. The handshaking generally takes the form of a connect request from the local unit and a connect response from the remote unit. Then the data from the local unit can be encapsulated in a data packet or some other form of data transfer and sent to the remote unit for processing.

If the remote unit becomes unstable or lost during the processing, the communication system typically must go through a power cycling to restore use of the local unit to the local user. This results in a disruption of service to the local customer that probably ends up with a loss of productive work. There is a resulting need in the art for a communication system that does not require power cycling in order to restore service to a locked-up communication device.

SUMMARY OF THE INVENTION

The embodiments of the present invention encompass a method for a remote unit to trigger a log-off of a data link layer pass-through application in a local unit. When data is received over the remote unit's data link layer, the data link layer determines if a remote unit session layer is active. This may be accomplished by checking a session state indicator If the session layer is active, the received data is processed in the session layer. If the session layer is inactive, the remote unit's data link layer transmits a disconnect request to the local unit's data link layer in order to abort a pass-through application in the local unit.

DETAILED DESCRIPTION

The embodiments of the present invention provide a communication system with the ability to recover from a critical system lock-up condition. The system recovers without loss of service to the customer by automatically routing user input data to local applications and terminating the data pass-through mode.

Figure 1:
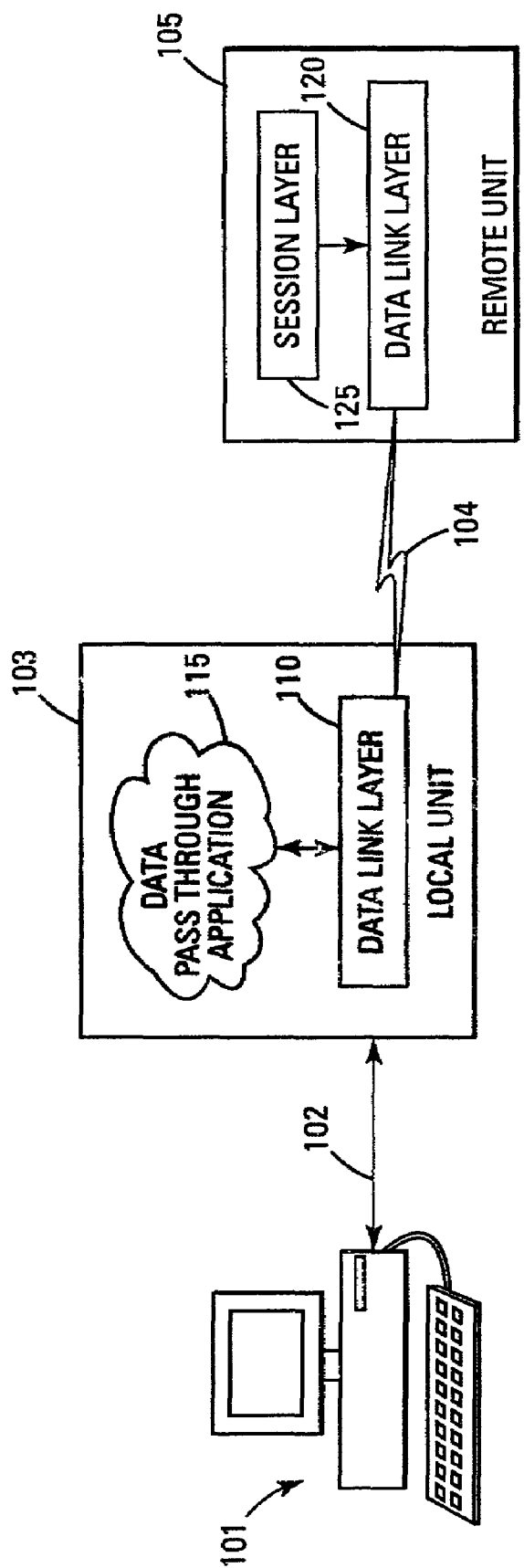
FIG. 1 shows a block diagram of one embodiment of a communication system of the present invention.

FIG. 1 illustrates one embodiment of a communication system of the present invention. The system has a local user/customer computing device (101) that inputs the data to be transmitted. The local computing device (101) may be any type of computer such as a desktop computer, a laptop computer, or a palm computer.

The computing device (101) is connected to a local unit (103). The local unit, in one embodiment, is a modem (103). For example, the local unit is a Digital Subscriber Line (DSL) modem.

The local unit (103) is connected to the computing device (101) over a network connection (102). The network connection (102) can be to any one of the many types of networks available such as Ethernet, Universal Serial Bus, Token Ring, or IEEE 1394 (FIREWIRE). The present invention is not limited to any one type of network connection.

As discussed subsequently with reference to FIG. 3, the local unit includes a controller that runs an operating system. The operating system is responsible for performing the processes required by a particular local unit. One such process may include a user interface such as a graphical user interface.

The graphical user interface enables menu driven control of the local unit (103) and all of its processes. For example, the graphical user interface may enable a computer user to select various processes of the local unit by keyboard or mouse control of icons or menus on a monitor. The embodiments of the present invention, however, are not limited to graphical user interfaces. The present invention may incorporate any type of user interface.

Additional local unit (103) processes possible in the modem embodiment include a session layer running a data pass-through application (115) and a data link layer (110). The data pass-through application (115) is responsible for controlling the flow of data through the data link layer (110) while the local unit (103) is in the pass through mode. The application performs the reading of the data from the local user computer (101) that is connected to one port of the local unit (103) and transmitting the data to the port that is connected to the remote unit (105) through the communication link (104).

The data link layer (110) manages the physical communication channel specified by any data structure. For example, if the local unit (103) is a DSL modem, the DSL data frame structure determines the operation of the data link layer (110). The data link layer (110) is responsible for transmitting the data structures over the communication link (104) between the local unit (103) and the remote unit (105).

The communication link (104), in one embodiment, is a cable between the two units (103 and 105). Alternate embodiments use other forms of communication links such as an RF link.

The remote unit (105) is similar to the local unit in that it includes a controller that executes an operating system. The operating system is responsible for performing the various processes of the remote unit (105). The remote unit (105) may serve as a local unit (103) and vice versa, depending on the location of the local computing device (101).

The processes executed by the remote unit's operating system include a session layer (125) and a data link layer (120). The session layer (125), in one embodiment, includes a graphical user interface process as described above. The session layer (125) may also include any other type of software program or process that is to be executed by the remote unit (105).

The data link layer (120) of the remote unit (105), as in the local unit (103), is responsible for managing the physical communication channel specified by the data structure. In the case of the remote unit (105), the data link layer (120) does not act as a data pipe but instead enables the processes of the remote unit (105) to communicate with local units (103).

For purposes of clarity, the system of FIG. 1 shows only one computing device (101), one local unit (103), and one remote unit (105). It is possible, however, for a system to have multiple computing devices (101), multiple local units (103), and multiple remote units (105).

Figure 2:
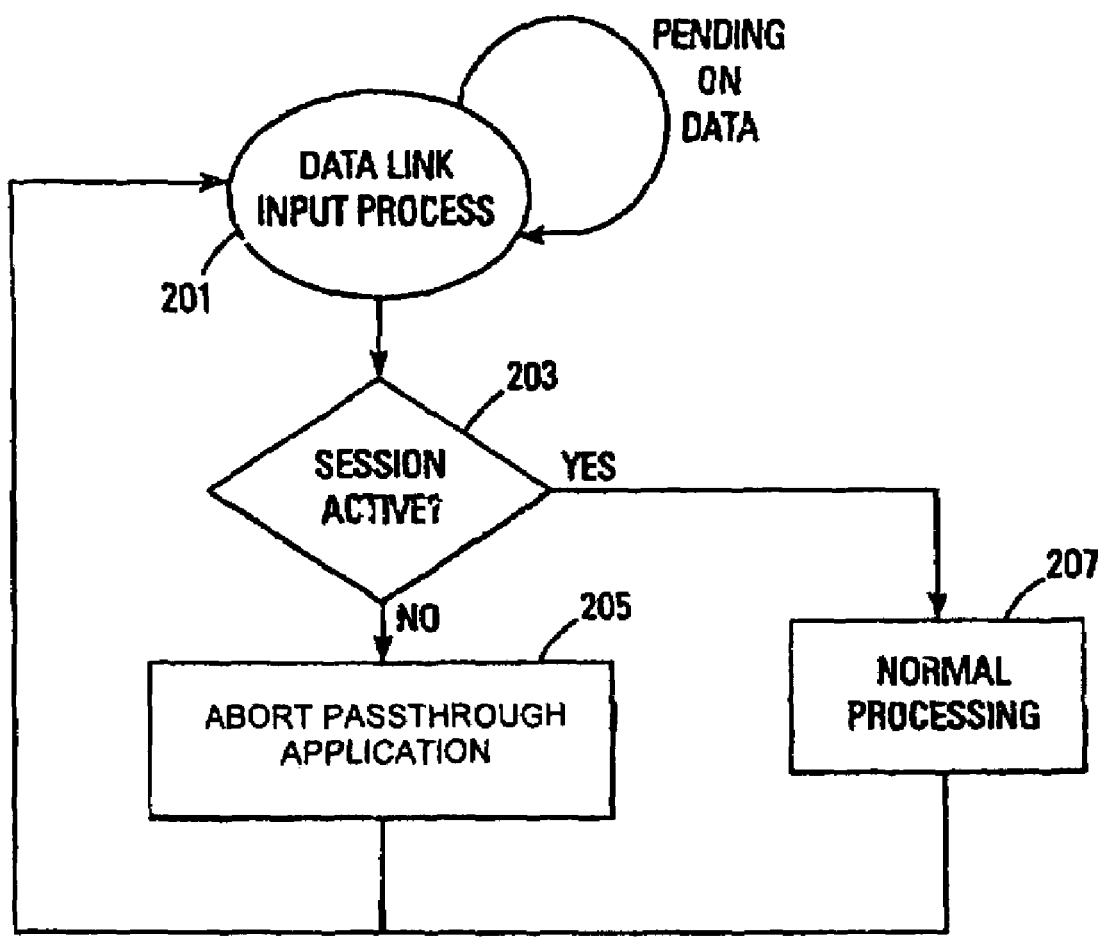
FIG. 2 shows a flowchart of one embodiment of a data link layer log-off trigger method of the present invention.

FIG. 2 illustrates a flowchart of one embodiment of an automatic data link layer log-off trigger for offline session conditions. In one embodiment, this method is executed by the remote unit's data link layer (120).

The data link input process (201) waits until data has been received from a local unit's data link layer. Once data has been received, it is determined whether the session layer is still active (203). This validation test is performed during all data link layer input processing requests.

A state indicator shows the state of the session layer. In one embodiment, the state may be either an active state or an inactive state. Alternate embodiments indicate other possible states. The state indicator may be part of the firmware of the remote unit and its indication controlled by the operating system. When the session layer becomes unstable, the operating system of the remote unit sets the state indicator to the inactive state.

Referring again to FIG. 2, if the session layer is still active, normal processing is performed (207) on received data as required by the processes running in the remote terminal's session layer. If the state indicator indicates that the session layer is inactive (203), the pass-through application of the local unit is aborted (205) or logged-off. An inactive session indicates that the session layer has locked up and is no longer operating properly.

The remote unit's data link layer coordinates the log-off by sending a disconnect request to the data link layer of the local unit. After the local unit's data link layer receives the disconnect request, it routes all user input to local applications and terminates the pass-through mode. The computing device user now has access to the graphical user interface of the local unit instead of sending data to an inactive session at the remote unit.

The computing device user reestablishes the pass-through mode by accessing the local unit's control functions through the graphical user interface. The local unit's data link layer can then reinitiate a communication session with the remote unit's data link layer as previously described.

The embodiments of the data link layer log-off trigger method permit the local user to break contact with the locked-up remote unit session layer and then reestablish contact. This is analogous to rebooting a computer after a program has become unstable. However, the embodiments of the present invention enable the reinitialization to occur without cycling power that would cause loss of service or control by the user/customer.

Figure 3:
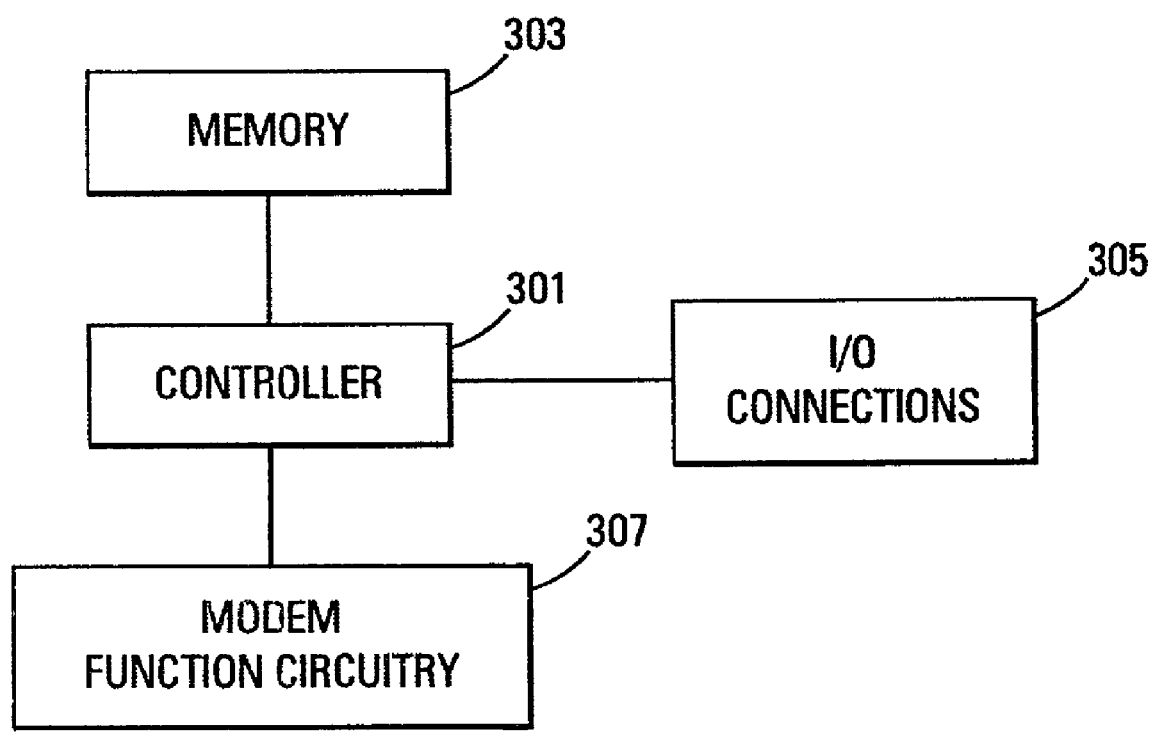
FIG. 3 shows a block diagram of one embodiment of a communication device of the present invention.

FIG. 3 illustrates a block diagram of one embodiment of a communication device of the present invention. In one embodiment, the communication device is a DSL modem. Alternate embodiments use other types of communication devices.

The modem can be manufactured in various configurations. In one embodiment, the modem is a circuit card that fits into a card cage. Alternate modem embodiments use other configurations.

The modem has a controller (301) that controls the operation of the modem card. The controller (301) may be a microprocessor, a microcontroller, or some other form of control circuitry.

Memory (303) is coupled to the controller (301) to store data for use by the controller (301). The memory (303) can be semiconductor, magnetic, and/or optical. In this embodiment, the memory (303) contains the applications, processes, and data of the data link layer log-off trigger processes of the present invention.

Input/Output (I/O) connections (305) enable the communication device to communicate with the computing device as well as other components of the communication system. In one embodiment, the I/O connections (305) include circuit card contacts such as connectors, circuit card fingers, or other types of connections. In another embodiment, the I/O connections (305) include network connections such as USB connectors and Ethernet connectors. The I/O connections (305) also represent the cable connections that couple the local unit to the remote unit.

Modem function circuitry (307) provides the communication device with the ability to communicate over communication links with other modems. The modem function circuitry (307) is coupled to the controller (301) and enables the computing device to communicate over the communication links with remote units. The modem functions include the modulator, demodulator, and any other functional circuitry required for modem operation. Modem operation is well known in the art and is not discussed further.

In summary, the embodiments of the automatic data link layer log-off trigger method and system enable a local computer user to maintain control of a local modem after a remote modem has become unstable and/or locked-up. The data link layers of the units coordinate an automatic log-off of the local unit from the remote unit. The user maintains control of the local unit in order to reestablish the session, through the data link layers, with the remote unit.

Numerous modifications and variations of the present invention are possible in light of the above teachings. It is therefore to be understood that within the scope of the appended claims, the invention may be practiced otherwise than as specifically described herein.

What is claimed is:

1. A method for triggering a log-off of a data link layer pass-through application, the method comprising:
   when data is received over the data link layer, determining if a session layer is active;
   if the session layer is active, processing the received data in the session layer; and
   if the session layer is inactive, aborting the data link layer pass-through application in a local unit.

2. The method of claim 1 wherein the session layer comprises a user interface.

3. The method of claim 2 wherein the session layer comprises the user interface and software processes.

4. The method of claim 1 wherein aborting the data link layer pass-through application comprises:
   a remote unit transmitting a disconnect request to the local unit through the data link layer; and
   the local unit routing user data inputs to a local user interface.

5. The method of claim 1 and further including checking a state indicator to determine if the session layer is active or inactive.

6. A method for a remote unit to trigger a log-off of a data link layer pass-through application in a local unit, the method comprising:
   waiting for input data from the local unit through the data link layer;
   when data is received, determining ifs session layer in the remote unit is active;

if the session layer is active, processing the received data in the session layer; and if the session layer is inactive, aborting the data link layer pass-through application in the load unit.

7. The method of claim 6 wherein the session layer in the remote unit comprises a graphical user interface.

8. The method of claim 6 wherein a session layer in the local unit comprises a graphical user interface.

9. The method of claim 8 wherein aborting the data link layer pass-through application comprises:

the remote unit transmitting a disconnect request to the local unit trough the data link layer;

the local unit routing user data inputs to the local graphical user interface; and the data link layer in the local unit reestablishing a connection with to remote unit's data link layer.

10. A method for a remote modem to trigger a log-off of a data link layer pass-through application in a local modem, both the remote modem and the local modem having a session layer and a data link layer, the method comprising:

waiting for input data from the local modem through the data link layer;

when data is received, determining if the session layer in the remote modem is active as indicated by a state indicator;

if the session layer is active, processing to received data in the remote modem session layer; and if the session layer is inactive, aborting the data link layer pass-through application in the local modem.

11. The method of claim 10 wherein to remote and local modems are digital subscriber line modems.

12. A data communications system comprising:

a computing device that generates user data a local unit comprising:

a session layer that executes a user interface and a data pass-through application; and a data link layer that responds to the data pass-through application by passing the user data through the local unit to a communication link; and a remote unit coupled to the communication link, the remote unit comprising:

a session layer that executes a user interface; and a data link layer tat receives the user darn and determines a status of the session layer, the data link layer transmitting a disconnect request to the local unit data link layer in response to an inactive status.

13. The system of claim 12 wherein the local unit and the remote unit are modems.

14. The system of claim 12 wherein the local unit data link is capable of routing the user data to the local unit graphical user interface in response to the disconnect request.

15. A data communications system comprising:

a computer that generates user data in response to a user input;

a local modem comprising:

a session layer that executes a graphical user interface and a data pass-through application; and a data link layer that responds to the data pass-through application by passing the user data through the local modem to a communication link; and a remote modem coupled to the communication link, the remote modem comprising:

a session layer that executes a graphical user interface; and a data link layer that. receives the user data and determines a status of the session layer by checking a state indicator, the data link layer capable of transmitting a disconnect request to the local modem data link layer in response to an inactive status.

16. A communication device comprising:

an operating system that executes processes in the communication device;

a session layer that comprises the executed processes including a user interface; and a data link layer capable of detecting a status of the session layer and generating a disconnect request in response to an inactive indication of the status.

17. The communication device of claim 16 wherein the device is a digital subscriber line modem.

18. A modem comprising;

modem circuitry that modulates user data to be transmitted and demodulates received data;

memory that stores data for use by the modem; and a controller, coupled to the memory, that is capable of executing an operating system tat operates a session layer comprising graphical user Interface and a data pass-through application, the controller further executing a data link layer that receives a disconnect request from the modem circuitry such that the data link layer routes any further user data to the graphical user interface.

19. The modem of claim 18 wherein the modem is coupled to a computer that generates the user data.

20. A modem comprising:

modem circuitry that modulates user data to be transmitted and demodulates received data;

memory that stores data for use by the modem; and a controller, coupled to the memory, that is capable of executing an operating system that operates a session layer comprising graphical user interface, the controller further executing a data link layer that generates a disconnect request in response to an inactive status indication of the session layer, the controller transmitting the disconnect request to the modem circuitry.

* * * * *